United States Patent
Johnson (12)

(10) Patent No.: US 11,319,480 B2
(45) Date of Patent: *May 3, 2022

(54) INCREASED AVAILABILITY AND REDUCED COSTS FOR VISCOELASTIC SURFACTANTS USED IN HYDROFRACTURING FLUIDS

(71) Applicant: Axel R. Johnson, North Babylon, NY (US)

(72) Inventor: Axel R. Johnson, North Babylon, NY (US)

(*) Notice: Subject to any disclaimer, the term of this patent is extended or adjusted under 35 U.S.C. 154(b) by 6 days.

This patent is subject to a terminal disclaimer.

(21) Appl. No.: 16/893,931

(22) Filed: Jun. 5, 2020

(65) Prior Publication Data

US 2020/0299570 A1  Sep. 24, 2020

Related U.S. Application Data

(60) Continuation of application No. 15/991,459, filed on May 29, 2018, now Pat. No. 10,676,664, which is a continuation-in-part of application No. 15/668,864, filed on Aug. 4, 2017, now abandoned, which is a division of application No. 13/434,049, filed on Mar. 29, 2012, now Pat. No. 9,725,641.

(51) Int. Cl.
| | |
|---|---|
| *C09K 8/62* | (2006.01) |
| *C09K 8/72* | (2006.01) |
| *C09K 8/035* | (2006.01) |
| *C09K 8/70* | (2006.01) |

(52) U.S. Cl.
CPC ............... *C09K 8/72* (2013.01); *C09K 8/035* (2013.01); *C09K 8/62* (2013.01); *C09K 8/70* (2013.01); *C09K 2208/12* (2013.01); *C09K 2208/28* (2013.01); *C09K 2208/30* (2013.01)

(58) Field of Classification Search
CPC . C09K 8/72; C09K 8/70; C09K 8/035; C09K 8/62; C09K 2208/12; C09K 2208/28; C09K 2208/30; C09K 8/685; C09K 8/68; C09K 8/90; C09K 8/032; C09K 8/512; C09K 8/588; C09K 8/805; C09K 8/665; C09K 8/80; C09K 8/882; C09K 8/74; C09K 8/92; C09K 2208/00; C09K 8/12; C09K 8/516; C09K 8/584; C09K 8/604; C09K 2208/08; C09K 8/03; C09K 8/08; C09K 8/36; C09K 8/514; C09K 8/52; C09K 8/524; C09K 8/60; C09K 8/602; C09K 8/887; C09K 2208/32; C09K 8/20; C09K 8/64; C09K 8/88; C09K 2208/26; C09K 8/26; C09K 8/34; C09K 8/40; C09K 8/42; C09K 8/467; C09K 8/473; C09K 8/50; C09K 8/502; C09K 8/528; C09K 8/54; C09K 8/5756; C09K 8/58; C09K 8/725; C09K 8/86; C09K 8/885; C09K 8/905; C09K 17/30; C09K 2208/04; C09K 2208/10; C09K 2208/22; C09K 2208/24; C09K 3/22; C09K 8/10; C09K 8/145; C09K 8/206; C09K 8/24; C09K 8/28; C09K 8/424; C09K 8/44; C09K 8/48; C09K 8/5045; C09K 8/506; C09K 8/508; C09K 8/5083; C09K 8/536; C09K 8/56; C09K 8/57; C09K 8/572; C09K 8/5751; C09K 8/5755; C09K 8/5758; C09K 8/582; C09K 8/607; C09K 8/608; C09K 8/703; C09K 8/76; C09K 8/82; E21B 43/267; E21B 43/26; E21B 43/16; E21B 43/25; E21B 21/003; E21B 7/00; E21B 21/00; E21B 43/261; E21B 21/06; E21B 21/08; E21B 33/138; E21B 37/06; E21B 43/025; E21B 43/04; E21B 2021/005; E21B 21/001; E21B 21/01; E21B 21/065; E21B 33/12; E21B 33/13; E21B 36/003; E21B 41/02; E21B 43/00; E21B 43/119; E21B 43/12; E21B 43/126; E21B 43/20; E21B 43/24; E21B 43/247; E21B 43/255; E21B 43/40; E21B 44/00; E21B 49/00; E21B 49/08; E21B 4/18
See application file for complete search history.

(56) References Cited

U.S. PATENT DOCUMENTS

| | | | |
|---|---|---|---|
| 4,780,220 | A | 10/1988 | Peterson |
| 4,802,998 | A | 2/1989 | Mueller et al. |
| 5,403,820 | A | 4/1995 | Walker |
| 5,908,946 | A | 6/1999 | Stern et al. |

(Continued)

FOREIGN PATENT DOCUMENTS

| | | |
|---|---|---|
| GB | 2283036 A | 4/1995 |
| WO | WO 2008/156612 A1 | 12/2008 |
| WO | WO 2010/066513 A1 | 6/2010 |

OTHER PUBLICATIONS

Isahak, W.N.R. Wan et al., "Recovery and purification of crude glycerol from vegetable oil transesterification," Separation & Purification Reviews, 44:250-267 (2015).

(Continued)

*Primary Examiner* — Kumar R Bhushan
(74) *Attorney, Agent, or Firm* — Locke Lord LLP; Alan B. Clement; Nicholas J. DiCeglie, Jr.

(57) ABSTRACT

The invention provides a method for employing the total product stream from hydrolysis of triglycerides comprising fatty acids, glycerin and water to address at the environmental issues associated with drilling, completion and hydrofracturing wells employed for recovery of subterranean hydrocarbon deposits in an area of shale formation.

7 Claims, No Drawings

(56) References Cited

U.S. PATENT DOCUMENTS

| | | | |
|---|---|---|---|
| 6,806,231 | B2 | 10/2004 | Schilling et al. |
| 6,890,451 | B2 | 5/2005 | Sapienza et al. |
| 7,138,071 | B2 | 11/2006 | Sapienza et al. |
| 9,725,641 | B2 | 8/2017 | Johnson |
| 10,676,664 | B2 | 6/2020 | Johnson |
| 2003/0168625 | A1 | 9/2003 | Sapienza et al. |
| 2006/0166837 | A1 | 7/2006 | Lin et al. |
| 2008/0006794 | A1 | 1/2008 | Sapienza et al. |
| 2010/0064746 | A1 | 3/2010 | Medoff |
| 2011/0155376 | A1* | 6/2011 | Robb ............ C09K 8/90 166/305.1 |
| 2011/0163257 | A1 | 7/2011 | Sapienza et al. |
| 2011/0275777 | A1 | 11/2011 | Stochniol et al. |
| 2012/0071369 | A1 | 3/2012 | Amanullah |
| 2015/0203741 | A1* | 7/2015 | Littich ............ C09K 8/86 507/221 |
| 2017/0335173 | A1 | 11/2017 | Johnson |

OTHER PUBLICATIONS

Hu, Shengjun et al., "Characterization of Crude Glycerol from Biodiesel Plants," J. Agric. Food Chem., 60:5915-5921 (2012).

Din, Nik Siti Mariam Nek Mat et al., "Preparation of polyglycerol from palm-biodiesel crude glycerin," Journal of Oil Palm Research, 25:289-297 (Dec. 2013).

Kale, Pratiksha et al., "Synthesis of Biodiesel from Low-Cost Vegetable Oil and Prediction of the Fuel Properties of a Biodiesel-Diesel Mixture," Ind. Eng. Chem. Res., 53:19654-19659 (Dec. 2014).

Lurgi, "Fatty Acid Technology," Oelmuhle Hamburg Aktiengesellschaft Corporate Website Brochure available to public prior to 2001, 2 pages.

International Search Report and Written Opinion of the International Searching Authority for Int'l App. No. PCT/US2019/034316 dated Jul. 9, 2019, 7 pages.

"Drilling For Oil", Modern Petroleum Technology, 3rd Edition, The Institute of Petroleum, London, E.I. 1962, p. 153.

Ismail, I. et al., "The Application of Methyl Glucoside as Shale Inhibitor in Sodium Chloride Mud", Jurnal Teknologi, 50(f) Jun. 2009, pp. 53-65.

"Glycerin Recovery—Crown Iron Works Company, A CPM Company," 8 pages.

Richardson, D.C., "Aircraft Deicing Fluid: The Recycling Solution—Can we achieve safety, convenience, and a clean environment?", Stormwater Mar.-Apr. 2008, The Journal for Surface Water Quality Professionals, 7 pages, http://www.stormh2o.com/forms/print-7447.aspx. Downloaded Dec. 19, 2008.

"Glycol Concentrator—Technologically advanced system for removing water from spent ADF", Inland Technologies Inc., Airport Glycol Recycling, downloaded on Jan. 4, 2010, 2 pages.

Arthur, J. D. et al., "Hydraulic Fracturing Considerations for Natural Gas Wells of the Marcellus Shale", Presented at The Ground Water Protection Council, 2008 Annual Forum, Cincinnati, Ohio, Sep. 21-24, 2008, pp. 9-12.

"Modern Shale Gas—Development in the United States: A Primer", Prepared by Ground Water Protection Council and ALL Consulting, Apr. 2009, pp. 61 and 62.

International Search Report corresponding to International Application No. PCT/US13/34327 dated Jun. 27, 2013.

Revised Draft Supplemental generic environmental impact statement on the oil, gas and solution mining regulatory program well permit issuance for horizontal drilling and high-volume hydraulic fracturing to develop the marcellus shale and other low-permeability gas reservoirs, revised dSGEIS dated Sep. 7, 2009 (dSGEIS dated Sep. 30, 2009), Lead Agency.

http://en.wikipedia.org/w/index.php?title=Glycerol&printable=yes, downloaded Apr. 14, 2014.

https://en.wikipedia.org/w/index.php?title=Biodiesel&printable=yes, downloaded May 5, 2016.

* cited by examiner

INCREASED AVAILABILITY AND REDUCED COSTS FOR VISCOELASTIC SURFACTANTS USED IN HYDROFRACTURING FLUIDS

CROSS-REFERENCES TO RELATED APPLICATIONS

This application is a continuation application of U.S. application Ser. No. 15/991,459, now U.S. Pat. No. 10,676,664, filed May 29, 2018, which is a continuation-in-part U.S. application Ser. No. 15/668,864, abandoned, filed Aug. 4, 2017, which is a divisional application of U.S. patent application Ser. No. 13/434,049, now U.S. Pat. No. 9,725,641, filed Mar. 29, 2012, all of which are hereby expressly incorporated by reference into the present application.

FIELD OF THE INVENTION

The present embodiments disclosed herein relate to processes employing industrial streams containing by-products of triglyceride processing as well as waste glycol streams recovered from several sources, to produce oil well drilling, completion and hydrofracturing fluids.

The embodiments provide a novel approach for employing the total product stream from hydrolysis of triglycerides comprising fatty acids, glycerin and water to address at least some of the environmental issues associated with drilling, completing and hydrofracturing wells employed for recovery of subterranean hydrocarbon deposits, as well as some cost issues impeding broader employment of viscoelastic surfactants (VES) in hydrofracturing and other oil-field operations, said novel approach also including siting the facility for performing said hydrolysis at a site in the vicinity of the wells being serviced.

BACKGROUND OF THE INVENTION

The presented embodiments address certain environmental and economic issues affecting the production of petroleum and natural gas. Over the past decade (2008/2017) U.S. crude oil production almost doubled from 5 million barrels/day to 9.4 million barrels/day. Natural gas has also increased and perhaps has greater potential, but it is currently limited by storage and shipment limitations. The introduction of horizontal drilling coupled with hydrofracturing developments has been an essential factor in this development.

This progress has been accompanied by environmental concerns—particularly regarding ground water contamination and flowback of water from the wells leading to surface-water contamination. Also, cost elements factor into justifiable use of newer techniques. Crude oil prices ebb, and flow driven by global marketplace issues. When crude prices drop much below $50/barrel, additions to the drilling-rig count can drop-off precipitously. Also, application of VES has been hindered because of cost issues that are addressed by the current approach.

In response to these issues, the embodiments disclosed herein present: a. several applications of the total effluent of a triglyceride hydrolysis operation, b. the economies associated with producing the products at a site in proximity to the end users and c. providing for an alternative use for the facilities during periods of lowered demand to chemicals used in oil and gas wells and d. optionally, the ability to relocate to more active areas when necessary.

The embodiments relate to novel processes to produce well drilling, completion and hydrofracturing fluids, that comprise industrial streams preferably produced when processing triglycerides.

Triglyceride containing feedstocks, such as vegetable and animal oils and fats, have been employed traditionally to produce soaps and other materials, such as fatty acids with crude glycerin streams as by-products of these processes. Virtually all of this crude glycerin was refined and distilled to produce purer grades, such as USP, technical grade and food grades, such as kosher or halal. Until recently there was a substantial market for pure glycerin, beyond that generated by processing of fats and oils. For example, Dow operated a plant in Freeport Tex. producing 60,000 tons/yr. of synthetic glycerin based on hydrocarbon feedstocks.

From a small start in the early 1990s, to a larger industry today, triglyceride-containing feedstocks have been reacted with alcohols in a transesterification reaction to produce monoesters that are used as diesel fuel—"biodiesel". In 2011 biodiesel production in the United States reached one billion gallons. As 0.7 pounds of glycerin is produced for each gallon of biodiesel, Glycerin production from this source amounted to about 350,000 tons of glycerin. In the face of this production Dow has shut down the Freeport facility, and finding stable, profitable markets for this product has been an important factor in the economics of biodiesel production.

The various process embodiments disclosed herein provide a means to meet this long felt need by employing the crude glycerin by-products of triglyceride processing in production of products for use in producing oil and gas well fluids. Glycols are also a useful component of certain glycerin-based drilling and completion fluids. Propylene glycol recovered from industrial applications, such as aircraft deicing operations, can be an economic source of this material. Oil and Gas Well Fluids—Drilling Fluids and Completion Fluids Drilling fluids, generally referred to as muds, are employed in drilling oil and gas wells to perform several functions. These were summarized by the Institute of Petroleum in "Modern Petroleum Technology", as follows; a. to remove cuttings continuously at reasonable velocities while ensuring that they need not be ground too finely before being lifted to the surface; b. to release the cuttings and the detritus readily from the return mud on screens and in settling pits; c. to form a gel, when flow ceases, so that cuttings entrained in the mud column do not settle down in the bottom of the hole; d. to act as a lubricant and coolant for the bit and drill column; e. to maintain the requisite pressures in the bore hole in excess of the reservoir pressures existing in gas, oil and water bearing reservoir fluids.

Drilling operation "completion" fluids are needed to contain the formation pressure during completion and servicing (workover) operations. Muds employed in drilling are occasionally used for this purpose, but more often, "clear" liquids including brines, such as solutions of zinc or calcium chlorides or bromides, are used to create a density adequate to contain the reservoir pressure during completion and workover operations. In practice, densities can range from about 8.4 to over 20 pounds per gallon. In some cases, it is necessary to take steps to employ screened liners, gravel screens or gravel packing to control influx of sand into the well bore.

Drilling fluids fall into two general categories; water-based muds and oil-based muds. Employing water-based mud when drilling through shale formations has led to several problems including sloughing shale, tight hole, gradual hole enlargement, poor hole cleaning, high torque and cementing failures (Ismail, I & Huang, A. P., Journal Technologi, 50(F) 53-65.COPYRGT. University Technologi Malaysia). While oil-based mud addresses these issues, its use has become restricted due to environmental regulations. Based on the absence of objectional aromatic compounds, biodiesel has been proposed as the basis for a more environmentally acceptable oil-based mud. Also, a number of developers have identified compounds that can be added to water-based drilling and completion fluids in order to mitigate the effects of water on shale formations and several parties have been exploring glycerin-based mud as an option. Glycerin, a hydrolysis product, has also been favorably evaluated as an additive to water-based mud.

Peterson (U.S. Pat. No. 4,780,220) teaches the use of glycerine and polyglycerine in drilling and completion fluids for use in shale formations, as well as the use of glycols to control the foaming tendency of glycerine in these applications. Peterson further teaches that the concentration of glycerines should be at least 6%, but preferably more than 25% in order to inhibit shale swelling.

Babayan (U.S. Pat. No. 3,667,774) and Lemke (U.S. Pat. No. 6,620,9040) present methods of preparing polyglycerine from glycerin. Valls (U.S. Patent Application 2008/0166837) teaches the use of glycerin as a well lubricant. Pomerleau (U.S. Pat. No. 8,071,509) relates to glycerin-based drilling fluids.

Gabriel V. C. Malgaresi, et al "A new Crude glycerin-based drilling fluid" Journal of Petroleum Science and engineering, 160 (2018) 401-411, propose use of glycerin as an alternative to oil-based muds in high pressure-high temperature fields. Marbun, B. T. H. et al of the Dept. of Petroleum Engineering, Institut Teknologi, Bandung, West Java, Inndonersia. Has studied the use of biodiesel by-product glycerin both as the basis for a synthetic mud and as additive to a water-based mud. They report significant improvements in water-based mud. American journal of Oil and Chemical Technologies, ISSN (online) 2326-6589. Vol1, issue 10, December 2013.

Walker (U.S. Pat. No. 5,403,820) teaches the use of alkyl glucosides—particularly methyl glycoside—in a water-based drilling fluid to inhibit shale swelling. He also teaches that it is preferred that the drilling fluid in this instance also contain at least 2% of an alkali metal hydroxide in order to have a pH above 8.5, and preferably 9-12.

In addition to the above enumerated constituents, drilling and/or completion fluids typically contain other additives including corrosion inhibitors, weighting agents (including salts, barites and other clays), defoamers, emulsifiers and biocides.

Schilling et al (U.S. Pat. No. 6,806,231) teaches advantages to employing beet molasses together with methyl glucoside, and that a salt—NaCl or KCl—appears to assist the shale-swelling effects of methyl glucoside. Schilling also identifies maltodextrins, carboxymethyl starches and hemicelluloses as useful constituents of drilling fluids.

Special mention is made of Sapienza, et al (U.S. Pat. No. 7,138,071) that teaches the inclusion of a variety of components as freezing point depressants in drilling fluids; including alkyl aldosides, maltodextrins and glycols and/or glycerin recovered from aircraft deicing operations. Also, to be noted, Sapienza, et al (U.S. Pat. No. 6,890,451) teaches inclusion of glycerin and glycerin-containing by-products of triglyceride processing as freezing point depressants in oil and gas well drilling fluids.

Taking the existing background into consideration, a need exists for economic sources of the ingredients of environmentally benign water-based drilling and completion fluids for application to oil and gas wells.

Oil & Gas Well Fluids—Hydraulic Fracturing Fluids

"Hydraulic Fracturing Chemicals and Fluids Technology by Johannes Fink published by Gulf Professional Publishing" presents a useful review and references in the field. At this time, in response to the growing need for clean energy sources, there exists a dramatic expansion in drilling operations associated with development of natural gas and hydrocarbon liquid resources associated with deep shale formations. This resource has now become economically viable through the development of advanced directional drilling techniques that permit drilling in several lateral directions from a given drilling site coupled with hydraulic fracturing (hydrofracturing) techniques that enable production of hydrocarbons from tight shale formations.

In addition to drilling and completion fluids, the above mentioned hydrofracturing techniques employed in production of hydrocarbons from tight shale formations employ substantial quantities of a fluid comprising primarily water and a "proppant", such as sand. This fluid is introduced at high pressure into the completed well to initiate and expand fractures in the shale formation and the proppant serves to preserve the expanded fractures thereby enabling an economic rate of recovery of hydrocarbons. These fluids also contain a small percentage (ca 0.5%) of "chemicals" (a chemicals package) that provide useful properties to the hydrofracturing fluid. D. Arthur, et al—Hydraulic Fracturing Considerations for Natural Gas Wells of the Marcellus Shale, presents a discussion of hydrofracturing with particular reference to the Marcellus shale of the Appalachian region. They state; "The fluids currently being used for fracture treatments in the Marcellus shale are water based or mixed slickwater fracturing fluids. Slickwater fracturing fluids are water-based fluids mixed with friction-reducing additives, primarily potassium chloride." The amount of hydrofracturing fluid used in a typical well can range from 2 to 4 million gallons.

"Modern Shale Gas Development in the United States—a Primer", a US DOE publication, presents the following breakdown of the "chemicals package" in percentages as contained in a typical hydrofracturing fluid;

| Component | vol % |
|---|---|
| acid | 0.123 |
| friction reducer | 0.088 |
| surfactant | 0.085 |
| KCl | 0.06 |
| gelling agent | 0.056 |
| scale inhibitor | 0.043 |
| pH adjusting agent | 0.011 |
| breaker | 0.01 |
| crosslinker | 0.007 |
| iron control | 0.004 |
| corrosion inhibitor | 0.002 |
| biocide | 0.001 |
| total | 0.490 |

The additives depicted in the above Table represent less than 0.5% of the total fluid volume. Overall the concentration of additives in most slickwater fracturing fluids is a relatively consistent 0.5% to 2% with water and proppant making up 98% to 99.5%.

Exhibit 35 of this DOE publication presents specific compounds that are used to provide the functions enumerated above. One of the concerns surrounding these hydrofracturing operations is the potential for contamination of potable water sources should the chemical-containing hydrofracturing water enter any natural aquifers in the area.

These developments are leading to an increasing need for economic sources of environmentally benign components of the chemical package added to hydrofracturing water.

As early as the 1960's polysaccharides such as guar and guar gums were employed to increase viscosity in fracturing fluids and as a medium in gravel-packing as part of the completion process. The table preceding shows a gelling agent that is probably a polysaccharide More recently, to achieve higher viscosities, crosslinkers such as borates have been added. These crosslinkers effectively combine molecules of the polysaccharides thereby increasing viscosity. Following the hydrofracturing operation, it is common practice to employ "breakers" such as ammonium persulfate to allow a controlled breakdown of the crosslinking of the polysaccharides to enable flow of the hydrocarbons.

Brown, et al (U.S. Pat. No. 5,264,295) reports several issues with polysaccharides including; Expenses and time required for hydration and crosslinking; Supplementary additives required such as bactericides, anti-foam agents, crosslinkers and others; Polysaccharides contain materials that concentrate in the formation during hydrofracturing; and Clean-up is an issue. Studies have shown that more than 60% of the polysaccharide may be left in the formation negatively affecting production of hydrocarbons.

The next advance in viscosity control of fracturing and gravel-packing fluids was a family of surfactants named viscoelastic (VES) fluids developed by Dow. These fluids entered the well fluid market in the 1990s.

The following patents and publications are examples of a substantial literature conveying background relevant to the developments and applications of hydrofracturing fluids employing VES.

Norman et al (U.S. Pat. No. 5,551,516), Brown, et al (U.S. Pat. No. 5,964,295) both assigned to Schlumberger, cost of the and Colaco, et al assigned to Rhodia and Schlumberger, teach the use of a viscoelastic surfactant (VES) comprising ammonium chloride salts of fatty acids as an improvement over the use of polysaccharides such as guar gum and hydroxyethylcellulose as thickening agents in hydrofracturing fluids. Colaco notes that the high costs of the surfactants has been a hindrance to the use of VES fluids.

Hoey, et al (U.S. Pat. No. 6,506,710), assigned to Akzo Nobel, teaches, for use in drilling muds and fracture fluids, a viscoelastic surfactant comprising as a gelling agent, fatty aliphatic amines (produced from fatty acids reacted with diamines) in a glycol or glycerin solvent.

Crews (U.S. Pat. Nos. 7,728,044 & 8,044,106) assigned to Baker Hughes, teaches effecting (increasing or decreasing) the viscosity of a fluid viscosified with VESs by the direct or indirect application of a composition containing at least one fatty acid that has been modified by reaction with one or more halide or ammonium salts. Robb et al (U.S. Pat. No. 8,544,546 assigned to Halliburton), teaches use of a dispersion consisting of polysaccharide and a carrier fluid comprising glycerin.

These are just examples. A scan of the patent office shows that Schlumberger alone has 44 patents containing "viscoelastic" in the title.

In spite of the claims for VES based fluids, guar gum continues to dominate the oil drilling market. The total market guar gum market, of which the oil well application consumes 60%, is predicted to grow from 1184 thousand tons in 2016 to 2178 thousand tons/yr. in 2022.

Cost is reported to be the main issue. Part of the cost results from the fact compared with polysaccharides, higher concentrations are needed. Norman (U.S. Pat. No. 5,551, 516) reports that concentrations of 1-8% in the aqueous fluid are required.

The embodiments disclosed herein propose to at least move the market to an extent by focusing on economies in manufacture.

Materials Employed in the Processes Disclosed Herein Include:

The present inventor has found that the issues and markets discussed above can be addressed by processes utilizing certain by-products and waste streams as described below.

The biodiesel industry, driven by US and European statutory requirements for alternative fuels, has led to a substantial increase in the supply of by-product crude glycerin and to a decrease from the historic price of both crude and refined glycerin from all sources. Against this background, the disclosed embodiments provide novel methods for producing desirable products for use as oil and gas well drilling, completion and hydrofracturing fluids, while at the same time reducing the costs of producing glycerin-containing products employing purer grades of glycerin.

The principal by-products for use in the present invention comprise the glycerin and fatty acids produced during several processes that employ raw materials comprising triglycerides. These raw materials include vegetable and animal oils and fats including, without limitation, soy and rapeseed oils and waste cooking oils.

1. Production of Monoesters, Soap, Glycerin and Fatty Acids

Triglyceride-containing raw materials are processed by several processes including; 1. Transesterification reactions with monoalcohols to produce monoesters. Production of monoesters has grown in response to the need for alternative fuels as monoesters, known as "biodiesel," which can function as an alternative or supplement to the use of petroleum-derived diesel fuel. 2. Hydrolysis of triglycerides to produce fatty acids for sale as such or for subsequent reaction with monoalcohols to produce monoesters, or with alkalis to produce soap. 3. Saponification (reaction with alkalis) to produce soap.

All of these reactions produce glycerin-containing by-product streams of varying purity. These processes are described more fully below.

a) Transesterification Crude Glycerin

This process is typically catalyzed by a homogeneous catalyst system employing as a catalyst either a base or an acid. The base catalyzed route is the most popular because of reaction efficiency, mild operating conditions and as it requires only simple materials of construction. Typically, the base catalyst will be NaOH or KOH dissolved in the alcohol that will be employed as a reactant in the process. Methanol is typically employed, but higher alcohols may be used.

The principal products of the transesterification reaction, oil-soluble monoesters and water-soluble glycerin—are typically separated by gravity decanting. The monoester phase is generally water-washed to remove any remaining glycerin, alkaline catalyst, soaps formed during the reaction and other water soluble impurities. This wash water is normally added to the glycerin phase to constitute a by-product glycerin stream. The resulting glycerin-containing stream (with or without the addition of wash water) is termed "transesterification crude glycerin," for convenience in the present specification. Both the monoester and the glycerin by-product will normally contain unreacted alcohol that typically are be removed by stripping and recycled to the reactor or disposed of otherwise.

Transesterification crude glycerin is often neutralized with an acid to convert the remaining alkaline catalyst to a salt and to convert soaps formed in the transesterification reaction to free fatty acids. Formation of soap during the transesterification reaction can result from the presence of free fatty acids in the triglyceride-containing raw material or from water in any of the materials being processed.

The fatty acids resulting from the reaction of the acid with any soaps formed can be recovered by gravity or centrifuge assisted separation. The remaining glycerin phase is termed "neutralized transesterification crude glycerin" and will generally comprise water, glycerol, the salt of the base catalyst and, depending on the efficiency of the separation of free fatty acids and other organic materials, MONG (matter organic not glycerol). A typical analysis of neutralized transesterification crude glycerin is shown in Table 1.

TABLE 1

| Component | wt % |
|---|---|
| Glycerin | 86.4 |
| salt | 3.1 |
| water | 10.5 |
| MONG | neg. |

There is considerable flexibility in choice of the base employed as a catalyst and in the acid used for neutralization. Consequently the crude glycerin could comprise one of several bases such as NaOH and KOH, while the salts contained in the neutralized stream could be sodium or, potassium salts such as acetates, chlorides, sulfates, lactates, etc.

b) Heterogeneous Catalyzed Transesterification Crude Glycerin

As taught by Stern (U.S. Pat. No. 5,908,946), a transesterification reaction employing a solid catalyst comprising zinc and alumina, with carefully controlled conditions can produce esters and a relatively pure glycerin by-product. At the same time minor impurities may be present in the glycerin by-product depending on the purity of the triglyceride raw material. For example, unless the raw materials (oils, fats and alcohol) are essentially water free, soaps may be formed that would be included in this crude glycerin. For purposes of this discussion this glycerin-containing stream will be referred to as "heterogeneous catalyzed transesterification crude glycerin."

In both the homogeneous and heterogeneous catalyst cases, water and or free fatty acids in the feed can react to form soaps that in turn will become free fatty acids following acidification of the crude glycerin. If a purer glycerin is desired, care is taken to avoid water and free fatty acids in the feeds can be esterified with glycerin to triglycerides before entering the transesterification reactor.

c) Hydrolysis Crude Glycerin

Hydrolysis of triglyceride-containing vegetable and animal fats and oils typically takes place at high temperature and pressure (ca 500 F and 600 psi) in a vertical counter-flow reactor with the fat/oil phase flowing upward and the hot water phase flowing downward. Reactor overheads contain the fatty acid product and the bottoms stream (hydrolysis crude glycerin) is a water/glycerol stream containing about 12-25% glycerol with a small amount of impurities, such as dissolved fatty material and proteins. The fatty acids produced can be reacted with caustic to produce soaps or with alcohols to produce monoesters that may be employed as biodies.

d) Saponification Crude Glycerin

Saponification, an alkaline hydrolysis of fats and oils with caustic, is the traditional method for manufacture of soap. In this method, fats and/or oils are mixed with caustic (such as sodium hydroxide) and boiled. After cooling, salt (NaCl) is added causing the mixture to separate into two layers with the "neat" soap on top and "spent lye" on the bottom. The "spent lye" is the primary by-product and comprises a mixture of glycerol, salt and unreacted caustic together with small quantities of unseparated soap. Typically this spent lye will contain 5-15% glycerol and 8-20% salt. Processing of the spent lye to recover glycerol can proceed through the following steps: a. Skimming off most or all of the free soap and then boiling the spent lye with fatty acid to remove free caustic followed by cooling and further skimming. b. Removal of impurities by coagulation with alum or ferric chloride (purified spent lye). c. Neutralization with an acid, such as HCl (neutralized spent lye). d. Addition of caustic to raise the pH range to 8.5-9.0 (pH adjusted spent lye).

As disclosed herein, the glycerol-salt solution obtained at any point in the above sequence ("saponification crude glycerin") could be employed as a raw material for the processes of this invention relating to drilling, completion and/or hydrofracking.

Distillation of Glycerin

Distillation is traditionally employed to produce essentially pure glycerin products (e.g. USP, technical grade, kosher, etc) from the crude glycerins described above. The Crown Iron Works website brochure describes distillation of crude glycerin from biodiesel production.

As the atmospheric boiling point of glycerin is 290° C., these distillation processes are normally conducted under vacuum to avoid high temperatures that would degrade the glycerin product. In the case of the crude glycerin from hydrolysis, the 12-25% crude glycerin can be processed without a vacuum through multi-stage evaporation to a concentration of about 88% prior to being distilled under vacuum in the manner described above. The Lurgi website brochure illustrates processing of hydrolysis glycerin that has been concentrated in this manner.

As an alternative to vacuum distillation, it is also possible to employ steam distillation employing systems known to persons skilled in the art, such as vapor recompression, as a means of avoiding excessive temperatures.

Crown Iron Works reports that bottoms from the still will contain 65-75% glycerin. If a neutralized transesterification crude glycerin as shown in Table 1 were being processed, this level of recovery would lead to rejection in the bottoms product of about 7-10% of the glycerin contained in the crude glycerin being processed. As the principal objective in these distillation processes is to maximize recovery of glycerin as a pure product, the vendors suggest that the bottoms product from the still—comprising some glycerin together with the salt and MONG contained in the crude glycerin—be processed in either a "foots" still or a thin film evaporator in order to maximize recovery of glycerin in a pure form.

Bottoms from these operations have been typically marketed as livestock feed additives or disposed of as wastes.

Membrane Separation Techniques

Muraldihara, in International Application WO 2008/156612, describes the application of membrane separation techniques to purification of crude glycerin. Membranes are designed to separate on the basis of molecular size. In descending order of molecule size, they can be ranked as follows; microfiltration—300-20,000 Å; ultrafiltration—25-1500 Å; nanofiltration—9-70 Å; reverse osmosis—1-20 Å.

In the processes of this invention, membrane separation may be employed to remove organic materials (MONG). Muraldihara shown a case in which a 32.9% glycerol, 2% NaCl and 1.0% MONG solution in water was processed through a nanofiltration membrane (MPS34 produced by Koch) yielding 89.6% of a stream containing 33.03% glycerol, 1.71% NaCl with no remaining MONG.

When processing glycerin streams containing low concentrations of water to remove MONG, it is preferable to add water for membrane separation to reduce the pressure needed to effect the separation. This need not be an issue in the present case as the oil and gas fluids being produced will require water in any event.

Recovery of Glycol from Industrial Waste Streams

In addition to glycerin-containing products, certain embodiments disclosed herein may make use of glycol recovered from industrial waste streams. Airports, in response to environmental concerns, are increasingly turning to collection and processing of the waste dilute streams of propylene glycol resulting from aircraft deicing applications (Stormwater—March-April 2008—"Aircraft Deicing Fluid—The Recycling Solution"). Also, propylene glycol can be recovered from waste heat transfer fluids and gas dehydration fluids.

Inland Technologies, Inc., in its website brochure, describes a concentrator that will produce a 50-60% glycol solution from deicing wastes containing 1-20% glycol. The concentrated product would be a useful additive to glycerin-containing drilling and completion fluids to avoid foaming. Other firms are offering similar products including the use of membrane separations.

Thus, there also exists a need in the art for processes by which glycol in industrial waste streams can be used economically and efficiently.

SUMMARY OF THE INVENTION

The present embodiments are directed to fluids employed in development and operation of wells for the recovery of gaseous and/or liquid hydrocarbons. Specifically; a. use of crude glycerin and recovered glycol streams and b. a novel processing facility employing a combination of three features for production of chemical additives for use in drilling and operating hydrocarbon wells. As well as, embodiments of combining biodiesel production with said hydrolysis operation, and locating the facility at or near said HC wells. This combination results in economical production of environmentally acceptable and effective chemicals for use in such fluids.

a. Processes for Employing the Crude Glycerin Streams Recited Above in Producing Blended Products for Use in Fluids for Oil and Gas Well Drilling and Completion.

The processes disclosed herein provide economic and efficient ways to employ crude glycerin streams, or materials derived from such streams, as a component of oil and gas drilling and completion fluids. Peterson (U.S. Pat. No. 4,780,220) has shown glycerin to be an effective additive to water-based drilling muds to prevent sloughing of shale and swelling of clays. Further, it has been found that glycerin is effective in insuring that drilled contaminants like salt, gypsum, anhydrite and calcium chloride are held in suspension rather than in solution thereby preventing deterioration of the mud. Concentrations as low as about 6% have been effective, and effectiveness he reported to continue to increase at concentrations over 25%. Also, glycerin is useful in a water-based mud in that it raises the boiling point thereby enabling operation at higher downhole temperatures.

The present inventor unexpectedly has found that the processes disclosed herein provide glycerin byproduct streams that can economically and efficiently be used instead of the purer glycerin employed in the prior art.

In addition to glycerin, there are several other materials that can be added to improve the effectiveness of a formulation in accordance with the present embodiments. 1. An issue with glycerin is foaming and a defoamer is needed. While there are commercially available defoamers, glycols can also serve this function. Peterson reports that propylene glycol is preferred as it is less sensitive to high temperatures than other glycols. In accordance with the present invention, the present inventor has found that propylene glycol recovered from industrial operations such as aircraft deicing can be used. Preferably, if such a glycol stream were concentrated to say 40-50%, any one of the above mentioned impure glycerin streams could be added thereto to make a product for use as a mud additive in accordance with the present invention. 2. As taught by Walker (U.S. Pat. No. 5,403,820), alkyl glucosides—particularly methyl glucosides (MEG)—are also effective in decreasing the swelling of hydratable shales. This phenomenon has been further studied by Ismail & Huang. These investigators found that a NaCl fluid increased shale recovery in a hot rolling dispersion test from about 10% with fresh water to about 55%. When MEG was added shale recovery was increased to about 80% at 35% MEG to about 90% with 35% MEG. Given these effects, it is apparent that MEG can be a useful additional additive for use with a glycerin-containing mud produce by the processes of the present invention. 3. A glycerin-containing drilling mud will require a number of other components. These can include; another form of glycerin—polyglycerine, lubricants, gelling agents such as drilled solids and bentonite or organic colloids and agents to control the filter cake at the bore interface such as methyl cellulose and lignite. Likewise, these additives can be added to the materials formed by the processes of the present invention, where desired. Completion fluids will not normally have gelling agents as there is not the need for suspension of cuttings, and not as much of a requirement for lubricants. Aside from these differences, a completion fluid will be similar to the drilling fluid in terms of properties to inhibit negative impacts on shales and clay. An important factor is maintaining the density necessary for the column of fluid to counteract the pressure at the producing formation. While a glycerin/water mixture will have a density higher than water, in many cases it would be desirable to include NaCl, $CaCl_2$ or other weighting agents in order to achieve the requisite density. Likewise, these weighting additives can be added to the materials formed by the processes of the present invention, where desired.

The processes disclosed herein employing crude glycerin streams that generally can be divided into two categories; 1. Processes comprising blending of one or more or the crude glycerin streams described above as a component of said agents or fluids. Prior to blending, steps may be employed to remove impurities. 2. Processes comprising separation of one or more or the crude glycerin streams described above into (1) one or more essentially pure glycerin streams, optionally comprising water and (2) a stream, comprising the glycerin remaining after recovery of the essentially pure glycerin stream, any salt(s), unreacted catalyst and/or any materials present in the crude glycerin having molecular weights and/or boiling points higher than glycerin. The separation can involve one or more of the techniques familiar to those skilled in the art including distillation and membrane separation.

DETAILED DESCRIPTION OF THE PRESENT INVENTION

1. Processes for Production of Oil and Gas Drilling and Completion Fluids and Hydrofracturing Fluids Based Upon Crude Glycerin The crude glycerin streams resulting from the processes described above—may be employed in the processes of this invention for producing oil and gas well drilling and completion fluids. Table 2 presents typical ranges of concentrations of the components in these aqueous solutions.

TABLE 2

|  | Glycerin- wt % | ash- wt %* | MONG |
|---|---|---|---|
| transesterification crude glycerin | 70-85 | 2-8 alkali | 2-15 |
| neutralized transesterification crude glycerin | 70-85 | 2-8 salts | neg-2 |
| heterogeneous cat transesterification crude glycerin | 90+ | neg. | traces, depending on feed preparation |
| saponification crude glycerin | 80 | 5-10 salts | 2-4 |
| hydrolysis crude glycerin | 12-25 | <1 | trace-2 |

Under certain circumstances, the present invention provides recovering any of these crude glycerin streams and employing them directly in producing drilling and/or completion fluids. The salts or alkalis could have useful functions as described earlier and, depending on the characteristics of the MONG, this material could supply surface activity or lubrication. Should this not be the case, the ultrafiltration step described above could be used to remove essentially all of the MONG.

In accordance with the processes disclosed herein, other materials may be added to produce a completed fluid. Among these would be; components selected from the group consisting of glycol, methyl glucoside, polyglycerine, salts, lubricants, gelling agents, methyl cellulose, corrosion inhibitors, weighting agents, water and mixtures of any of the foregoing.

Regarding hydrofracturing fluids, any of the crude glycerin streams could be employed as part of the "chemicals package" employed in production of these fluids. For example, the glycerol-containing by-product stream from alkali-catalyzed transesterification contains—or can be processed to contain—a substantial portion of the components of the chemicals package included in such hydrofracturing fluids.

Examples include the following; Glycerol—Glycerol can provide important functions required in hydrofracturing fluids. These include; (1) replacing ethylene glycol (a toxic material) as an agent to prevent scale formation and (2) as a friction reducer—replacing petroleum distillates that may contain carcinogens, such as benzene or other aromatic compounds. Salt—Depending on the choice of alkali as the transesterification catalyst, and the acid used to neutralize, a range of salts are possible. For employment of the glycerin by-product in hydrofracturing applications NaCl or KCl would be preferred The former would be useful as a breaker and KCl is employed to produce a "slickwater" fluid. Acid—If desired, an excess of HCl could be employed beyond that required for neutralization. Biodiesel—petroleum distillates are often used as friction reducers, but the presence of carcinogens such as benzene and other aromatics raise issues. The biodiesel product of the transesterification process is free of aromatic compounds could be employed in this service.

One exemplary procedure for manufacturing a "chemicals package" for inclusion in a hydrofracturing fluid could be; Using the glycerol-containing by-product described in Table 1 above, this could be used—as is—as a component of the hydrofracturing chemicals package. Glycerol, a non-toxic, environmentally benign compound, will function as a scale inhibitor (replacing ethylene glycol—a toxic chemical) and as a friction reducer. The salt present would supply part of the salt normally added. If potassium hydroxide were employed as the catalyst, then the KCl produced in neutralization would provide that component. Further, if the neutralization employed a surplus of HCl, this would also supply part, or all, of that compound. The other necessary chemicals (detergent, biocide, etc) could be added at the point of manufacture, or at the drilling site. The finished hydrofracturing fluid would comprise principally water combined with the "chemicals package," other necessary chemicals and proppants.

Processes Involving Separation of the Crude Glycerin Stream Leaving a Remainder that is at Least Partially Employed in Producing Oil & Gas Well Drilling and/or Completion Fluids.

Separation by Distillation

Some processes disclosed herein may include distillation as an element of the process. As described earlier, in the case of crude glycerin from processes including transesterification, saponification and hydrolysis, it has been common practice in refining glycerin from such sources to distill—normally under a vacuum—with an emphasis on maximizing the recovery of a pure glycerin. To this end, it has been normal practice to add a processing step—such as a "foots still" or, alternatively, a wiped film evaporator—to insure maximum recovery of glycerin from the distillation bottoms stream.

In the case of hydrolysis crude glycerin, the 12-25% crude glycerin by-product can be processed without a vacuum through multi-stage evaporation to a concentration of about 88% prior to being distilled under vacuum in the manner described above.

As an alternative to vacuum distillation, it is also possible to avoid excessive temperatures by employing steam distillation employing techniques known to parties skilled in the art such as vapor recompression.

In contrast to the stress on maximizing glycerin recovery in the distillation processes described in the manufacturers brochures, certain processes of this invention require substantial amounts of glycerin to be left in the distillation bottoms, thereby producing a functional fluid rather than a high salt content waste or low-valued animal feed component. Depending upon the requirements of the markets for the overhead and bottoms products, the amount of glycerin remaining in the bottoms product in operations under this invention will vary, typically from about 6% to about 30% or more of the glycerin contained in the distillation process feed. Employment of at least part of this functional fluid as a component of oil and gas well fluids is a novel element of this invention.

If the crude glycerin being distilled comprises organic impurities (MONG), virtually all of these are higher-boiling compounds that will remain in the still bottoms. For many industrial applications of these still bottoms these impurities may not be objectionable and, in those cases, do not need to be removed prior to application. However, if a purer product is required, one option is to employ an ultrafiltration step employing a nanofiltration membrane such as MPS34 from Koch. Such as procedure may require adding water to the glycerin/salt bottoms, but addition of water will likely be required in any event for most applications of the bottoms stream. When the distillation overhead product is to be refined to a purer grade, the water removed in this process may conveniently be employed as the diluent for this procedure.

In many cases, particularly where the transesterification facility and the distillation process are under common control, MONG content of the crude glycerin can be controlled by eliminating water from the triglyceride-containing feed materials and if free fatty acids are present, esterifying these with glycerin to form triglycerides. These steps minimize production of soaps during the transesterification reaction that are then converted to fatty acids during neutralization. Also, centrifuging neutralized crude glycerin following acidification/neutralization of the byproduct glycerin stream can assist in separating any fatty acids formed during neutralization.

It has been typical practice, when distilling crude glycerin streams comprising water, to withdraw the essentially pure glycerin as a side-stream from the distillation column. Water, together with any alcohol and minor quantities of glycerin, will then comprise the overhead product. The relatively pure side-stream product is then further refined to meet the specification for USP glycerin or food grades such as kosher or halal. This processing step may comprise treatment with activated carbon.

This processing sequence can be employed in the embodiments herein, and the overhead product can be produced to meet USP and/or food grade specifications. However in this case the still bottoms, to be employed as an oil and/or gas well fluid, will contain 6%, or more, of the glycerin contained in the crude glycerin feed.

Alternatively a single overhead stream can be produced in the distillation step. This product will contain all of the water contained in the crude glycerin as well as the glycerin not contained in the bottoms. Following any purification required to remove other material such as any alcohol and/or MONG, this product can be employed in manufacture of various products or can be sold as Technical grade glycerin. Also, in the context of this invention, such essentially pure glycerin products, that may contain water, can be employed in production of oil and gas well drilling and completion fluids.

In the case of producing a chemicals package for hydrofracturing, the present invention contemplates distillation of the Table 1 compound to produce a salt-free glycerin/water overhead product and a glycerin/salt bottoms product. In this way the glycerin/salt ratio in the bottoms product can be controlled to meet the ratio desired in the hydrofracturing chemicals package. The excess acid could be added after distillation to avoid corrosive conditions in that process.

Separation by Membrane Processing

As noted earlier, where desired, the crude glycerin streams can be purified using ultrafiltration to reject MONG. Muraldihara shows that this procedure can also include reverse osmosis steps leading to pure glycerin as a final product. There are several intermediate points in this process where the intermediate product is a fluid comprising glycerin, salt and water. Such fluids could be usefully employed in the oil and gas fluids of this invention.

The processes described above may be practiced at one site to produce a finished product or alternatively, the streams produced at the source of the glycerin-containing by-product, or at the distillation site, may be shipped—with or without added water and/or other components—to another site for finishing and/or use.—

The focus of the present embodiments are methods to improve availability and costs of viscoelastic surfactants (VES) and of glycerin for the "chemical package" of hydrofracturing fluids and for use as a medium for gravel packing, as well of glycerin for multiple uses in drilling and completion fluids.

In this regard, the embodiments include: 1) locating a processing plant, comprising a triglyceride hydrolysis reactor as a central feature, in an area where there is substantial oil &/or gas drilling activity—particularly an area involving production from tight shale formations requiring hydrofracking. As a rule of thumb, the processing plant could be located to serve delivery of oil-field chemicals to several drilling locations within a one-day truck delivery radius. The hydrolysis plant can have the capability of delivering the total product of the reaction as one stream comprising fatty acids, glycerin and water, or two separate products—an oil-soluble fatty acid, and a glycerin/water product. 2) locating a second processing plant, designed for esterification of fatty acids, either at the same site as the hydrolysis unit, or at a location such as a petroleum refinery within a one-day truck delivery radius. The esterified fatty acids may have a use as a friction reducing additive to the "chemical package", as well as a use as an internal combustion engine fuel—"biodiesel".

Optional processing facilities at the site of the hydrolysis unit may include: a) Facility for preparing VES from the fatty acids produced at the site; b) Facilities for removing water from the glycerin/water hydrolysis product; c) Facility for finishing fatty acid esters for use or sale as biodiesel; and d) Facilities for conversion of glycerin to polyglycerin.

The features of this arrangement are: Locating the hydrolysis plant with access to several drilling operations improves the economics of employing products such as viscoelastic surfactants as compared with the option of purchasing VES from distant locations; The fatty acid customer will have the option of choosing the form of triglyceride employed in the hydrolysis step. In several patents specific triglyceride sources are preferred (e.g. erucyl acid, or rapeseed oil, in Brown '296); Low cost sources such as waste cooking oils may be used when there is less need for specific characteristics. These may include biodiesel or VES in less critical services such as gravel placement; and The biodiesel option provides an income stream, even between drilling chemical requirements.

Variations of the embodiments disclosed herein will suggest themselves to those skilled in the art in light of the above described processes. All such obvious modifications are within the full intended scope of his invention.

The above referenced patents and publications are hereby incorporated by reference.

What is claimed is:

1. A method for reducing costs of fatty acids for use in drilling and recovery operations of hydrocarbons from subterranean deposits in an area of shale formations where hydrofracking operations are employed, said method comprising:
(i) erecting and operating a process plant within or in the vicinity of the area of shale formation, said process plant comprising facilities employing hydrolysis of triglycerides to produce fatty acids and a glycerin by-product, facilities for production of esters of the fatty acids, and optionally facilities for production of viscoelastic surfactants; and (ii) providing at least some of said drilling and recovery operations with at least one of the fatty acids, the viscoelastic surfactants, or the esters of fatty acids produced by the processing plant.

2. The method of claim 1, wherein said glycerin by-product is converted to a derivative for local use and/or sale for use in fluids for drilling and/or production.

3. The method claim 1, wherein said method further comprises facilities for removing water from the glycerin by-product to provide concentrated glycerin for sale and/or as a component of drilling/production fluids.

4. The method claim 1, wherein the esters of said fatty acids are produced employing low molecular weight alcohol, for use as hydrocarbon drilling/production fluid components and/or as biodiesel engine fuel.

5. The method of claim 2, wherein the derivative is polyglycerol.

6. The method of claim 1, wherein the esters of fatty acids are for use in drilling operations or derivative biodiesel.

7. The method of claim 1, wherein when appropriate to the end use, achieving savings in raw material costs by employing hydrolysis of triglycerides in said plant utilizing low cost raw materials.

* * * * *